3,158,676
GYROSCOPE MOUNTED CASSEGRAIN TELESCOPE WITH CENTRAL SUPPORT FOR SECONDARY MIRROR
Francis McCaffrey, China Lake, Calif., assignor to the United States of America as represented by the Secretary of the Navy
Filed Nov. 30, 1954, Ser. No. 472,267
4 Claims. (Cl. 88—32)
(Granted under Title 35, U.S. Code (1952), sec. 266)

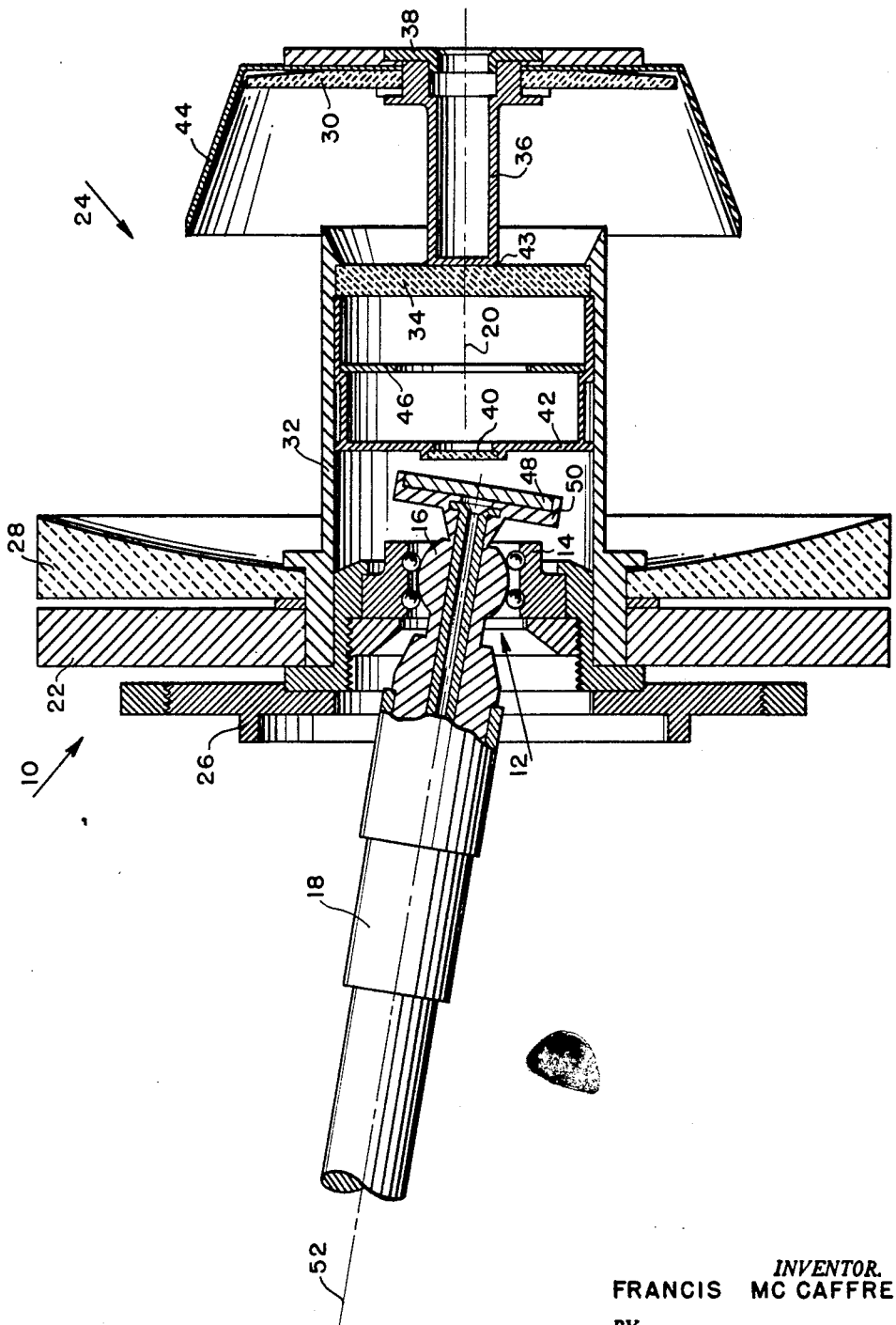

The invention described herein may be manufactured and used by or for the government of the United States of America for governmental purposes without the payment of any royalties thereon or therefor.

This invention relates to optical devices and in particular to improved means for mounting the secondary mirror of a Cassegrain type of telescope which is adapted to be rotated about its optical axis.

This invention is an improvement over previously used mounting means in which the secondary mirror of the telescope is supported by three rods, or spokes, running from the periphery of the support of the secondary mirror to the periphery of the support of the primary mirror. These spokes obstruct a certain amount of radiation from within the field of view of the telescope and prevent it from reaching the focal plane of the telescope. Further, the telescope is intended for use as a part of the rotor of a gyroscope and is adapted to be rotated about its optical axis. Normally the flux density of the light incident on the primary mirror is generally not uniform, therefore, the spokes chop, or modulate, the incident flux. The mounting means of the secondary mirror also can give rise to additional non-uniform flux densities from those that naturally exist due to reflection or radiation off the forward components of the telescope. The reflected radiation is principally due to bright objects, such as the sun, lying outside the field of view of the telescope.

It is, therefore, an object of this invention to provide support means for the secondary mirror of a Cassegrain type telescope which does not obstruct the radiant energy from sources within the field of view of the telescope.

It is a further object of this invention to provide support means for the secondary mirror of a Cassegrain type telescope which does not modulate the radiant energy at the focal plane of the telescope as the telescope is rotated about its optical axis.

Other objects and many of the attendant advantages of this invention will be readily appreciated as the same become better understood by reference to the following detailed description when considered in connection with the accompanying drawing, which is a cross section of a gyro rotor and telescope.

The rotor 10 of a free gyroscope is mounted on central ball bearing 12 which has an outer race 14 and an inner spherical race 16. Inner race 16 is formed at the end of gyro support post 18 which is rigidly mounted on means which are not illustrated. Rotor 10 is supported on post 18 for rotation about an axis of rotation 20 and for precession by means which are not illustrated with two degrees of freedom; i.e., rotor 10 can be precessed about two coordinate axes which intersect at the center of inner race 16 and are perpendicular to axis 20.

Rotor 10 consists primarily of a weight 22, which is in the form of a disc to provide mass; a modified type of Cassegrain telescope 24, and a counter balance 26 to provide statice and dynamic balance.

Telescope 24 consists of a primary spherical reflecting mirror 28 and a flat secondary reflecting mirror 30, both of which are first surface mirrors. Mirrors 28 and 30 are made from properly ground glass which is coated with a suitable reflective material, such as, aluminum or silver. Primary mirror 28 is mounted in close proximity with weight 22. Weight 22 and mirror 28 are fixedly mounted with respect to each other by suitable means, such as those that are illustrated. The secondary mirror 30 is mounted in front of mirror 28 by means of central support bracket, or hollow cylinder 32 which forms a component of the means for securing weight 22 and primary mirror 28 together; transparent glass disc 34, which is mounted in the end of cylinder 32, and post 36 which is secured to disc 34. Mirror 30 is fixedly secured to post 36 by means of clamp 38.

Primary and secondary mirrors 28, 30 are so mounted on rotor 10 that the optical axis of telescope 24 substantially coincides with the axis of rotation 20 of rotor 10. The longitudinal axes of cylinder 32 and post 36 also are substantially coincident with the axis of rotation 20 of rotor 10. A scanner 40, such as is disclosed in U.S. patent application No. 385,901, filed October 13, 1953, entitled Multislit Scanning disc by Lucien M. Biberman and Roger S. Estey, now Patent No. 3,034,405, issued May 15, 1962, is mounted at the focus of telescope 24, the focus being within cylinder 32 and lying on axis 20. Scanner 40 is held by bracket 42, which also aids in fixedly mounting transparent disc 34, in cylinder 32. Post 36 is secured to disc 34, in a preferred form by a suitable cement 43 such as "Chemotec 800" or "Epon VIII." Shade 44 which is mounted on secondary mirror 30 and baffle 46 which is press fitted into bracket 42 are provided to prevent radiant energy from outside the field of telescope 24 from falling upon scanner 40 and radiant energy responsive device 48. The field of view of telescope 24, in a preferred example, is 3°. Radiant energy responsive device 48 which, in a preferred form, is lead sulfide, is mounted on post 18 by support 50.

In operation, rotor 10 is rotated at high speed, in a preferred example, at a speed of 4200 revolutions per minute by means which are not illustrated. By caging mechanism, which is also not illustrated, the gyro roto axis 20 initially is made to substantially coincide with the longitudinal axis 52 of gyro support post 18. If a source of radiation, the magnitude of the intensity of which differs to an appreciable degree from that of radiation from other sources in the immediate vicinity of the first source, which first source shall hereafter be called the target, comes within the field of view of telescope 24, the radiation from the target will be reflected by the primary mirror 28 and the secondary mirror 30, will pass through disc 34, and will arrive at the focus of telescope 24 where scanner 40 is mounted. The radiant energy at the focus is chopped, or modulated, by scanner 40 to permit a desired variation of the radiant energy incident on the radiant energy responsive device 48. The variations of radiant energy at device 48 produce electrical signals the phase of which are a function of the deviation of the source of radiant energy from the optical axis. These signals can then be used to precess the rotor of 10 so that the target will substantially continuously lie on rotor axis 20 by means which are not illustrated since they do not form a part of this invention. Since transparent disc 34, through which all the radiation passes and which supports secondary mirror 30, passes all light incident thereon with uniform attenuation, support disc 34 does not modulate the radiant energy at the scanner disc 40.

Obviously many modifications and variations of the present invention are possible in the light of the above teachings. It is, therefore, to be understsood that within the scope of the appended claims the invention may be practiced otherwise than as specifically described.

What is claimed is:
1. In a Cassegrain telescope comprising a primary and a secondary mirror and a hollow tubular member between said primary and secondary mirrors, said telescope forming an integral portion of the rotor of a gyroscope, one end of said tubular member being fixedly mounted at the center of the primary mirror of the telescope, a transparent glass disc fixedly mounted within the other end of said tubular member, a post fixedly mounted on the center of said glass disc, and means mounted on said post for fixedly securing the secondary mirror with respect to the primary mirror, whereby radiant energy from sources within the field of view of the telescope is transmitted with substantially constant attenuation to the focal point of the telescope.

2. In a Cassegrain type telescope comprising a primary mirror and a secondary mirror, an optical axis, a focal point, said telescope forming a component of the rotor of a free gyroscope so that the telescope's optical axis substantially coincides with the axis of rotation of the gyro rotor, and a hollow tube between said primary and secondary mirrors having an axis, one end of said tube being fixedly mounted at the center of the primary mirror of the telescope so that its longitudinal axis substantially coincides with the optical axis of the telescope, a transparent disc of plain glass mounted in the other end of said hollow tube, a post, having a longitudinal axis, cemented to the glass disc so that the longitudinal axis of the post substantially coincides with the optical axis of the telescope, and means for mounting said secondary mirror on said post so that radiation from a source substantially lying on the optical axis of the telescope is focused at the focal point which is located within the hollow tubular member.

3. In a Cassegrain type telescope comprising a primary and a secondary mirror, and a hollow cylinder between said primary and secondary mirrors, said telescope having a focus and an optical axis and forming a component of the rotor of a free gyroscope so that the optical axis substantially coincides with the axis of rotation of the rotor, said hollow cylinder having a longitudinal axis, one end of said cylinder being fixedly mounted on the center of said primary mirror so that the longitudinal axis of the tube substantially coincides with the optical axis of the telescope, a transparent disc closing the other end of the tube, a post secured to the disc, and means for fixedly mounting the secondary mirror on said post so that the focus of the telescope is within the hollow cylinder.

4. In a Cassegrain telescope comprising a primary spherical reflecting mirror and a secondary plane mirror, and a hollow cylinder between said primary and secondary mirrors, each of said mirrors having openings formed in the centers thereof, said telescope having an optical axis and a focal point, and forming an integral portion of the rotor of a gyroscope, said hollow cylinder having a longitudinal axis, means for mounting the primary mirror around one end of said cylinder, a circular transparent glass disc, means mounting the glass disc in the other end of the hollow cylinder, a post having a longitudinal axis, means for mounting the post on said glass disc so that the longitudinal axis of the post substantially coincides with the longitudinal axis of the cylinder, and means for mounting the secondary mirror on the post so that the post extends within the opening formed in the secondary mirror, said telescope being so arranged and constructed that the focal point of the telescope lies on the longitudinal axis of the cylinder, within the hollow cylinder, and on the axis of rotation of the gyroscope rotor of which the telescope forms a part.

References Cited by the Examiner
UNITED STATES PATENTS

| | | | |
|---|---|---|---|
| 1,586,741 | 6/26 | Henderson | 88—1 |
| 2,534,543 | 12/50 | Bullock | 88—84 |
| 2,684,007 | 6/54 | Newell | 88—1 |

DAVID H. RUBIN, *Primary Examiner.*

SAMUEL BOYD, *Examiner.*